US010040237B2

(12) United States Patent
Chauvin et al.

(10) Patent No.: US 10,040,237 B2
(45) Date of Patent: Aug. 7, 2018

(54) APPARATUS AND METHOD FOR FABRICATING AND FILLING CONTAINERS

(71) Applicant: DISCMA AG, Zürich (CH)

(72) Inventors: Guillaume Chauvin, Duchess Manor (SG); Christophe Collin, Fuveau (FR); Damien Kannengiesser, Golbey (FR); Jean-Tristan Outreman, Septemes les Vallons (FR); Jean-Louis Pellegatta, Seillons Source d'Argens (FR)

(73) Assignee: DISCMA AG, Zürich (CH)

( * ) Notice: Subject to any disclaimer, the term of this patent is extended or adjusted under 35 U.S.C. 154(b) by 278 days.

(21) Appl. No.: 14/783,264

(22) PCT Filed: Apr. 8, 2014

(86) PCT No.: PCT/EP2014/056973
§ 371 (c)(1),
(2) Date: Oct. 8, 2015

(87) PCT Pub. No.: WO2014/166895
PCT Pub. Date: Oct. 16, 2014

(65) Prior Publication Data
US 2016/0046061 A1    Feb. 18, 2016

(30) Foreign Application Priority Data

Apr. 9, 2013 (EP) .................................... 13162944

(51) Int. Cl.
*B29C 49/46* (2006.01)
*B29C 49/12* (2006.01)
(Continued)

(52) U.S. Cl.
CPC .............. *B29C 49/46* (2013.01); *B29C 49/12* (2013.01); *B29C 49/58* (2013.01); *B65D 1/40* (2013.01);
(Continued)

(58) Field of Classification Search
None
See application file for complete search history.

(56) References Cited

U.S. PATENT DOCUMENTS 4,552,527 A    11/1985    Hunter
2010/0159058 A1    6/2010    Doudement

FOREIGN PATENT DOCUMENTS

EP    1529620 A1    5/2005
FR    2962931 A1    1/2012

OTHER PUBLICATIONS

International Search Report of PCT/US2014/056973 dated May 13, 2014.

*Primary Examiner* — Monica Huson
(74) *Attorney, Agent, or Firm* — Eric J. Sosenko; Jonathan P. O'Brien; Honigman Miller Schwartz and Cohn LLP

(57) ABSTRACT

An injection head for the fabrication of a container from a preform. An injection head interfaces with a mouth of the preform to establish fluid communication between a liquid supply and the mouth. The injection head includes an injection valve disposed within an outer shell of the injection head and configured to selectively permit fluid communication through the injection head upon displacement between an opened and a closed position. The injection head also includes an injection head cavity disposed between the injection valve and the outer shell and connected to the liquid supply. A liquid supply control mechanism and a control mechanism of the injection valve's opening allow fluid communication through the injection head. The control mechanism of the injection valve's opening is activated by the liquid under pressure in the injection head cavity when liquid supply is opened.

14 Claims, 8 Drawing Sheets

(51) Int. Cl.
  *B29C 49/58* (2006.01)
  *B65D 1/40* (2006.01)
  *B29C 49/06* (2006.01)
  *B29C 49/78* (2006.01)
  *B29C 49/48* (2006.01)
  *B29K 105/00* (2006.01)
  *B29L 31/00* (2006.01)

(52) U.S. Cl.
  CPC ............ *B29C 49/06* (2013.01); *B29C 49/783* (2013.01); *B29C 2049/465* (2013.01); *B29C 2049/4664* (2013.01); *B29C 2049/4879* (2013.01); *B29C 2049/5803* (2013.01); *B29K 2105/258* (2013.01); *B29L 2031/712* (2013.01)

APPARATUS AND METHOD FOR FABRICATING AND FILLING CONTAINERS

CROSS-REFERENCE TO RELATED APPLICATIONS

This application is the U.S. national phase of PCT Application No. PCT/EP2014/056973 filed on Apr. 8, 2014, and claims priority to EP13162944.6 filed on Apr. 9, 2013, the disclosures of which are incorporated in their entirety by reference herein.

FIELD OF THE INVENTION

This invention relates generally to an injection head for the fabricating and filling of a container. The invention also related to an apparatus for the fabricating and filling of containers and to a method of employing said injection head and/or apparatus to fabricate and fill containers, as well as the container so produced.

BACKGROUND

It is commonly known in the art of container fabrication to fabricate containers by the stretch blow molding process. In the stretch blow molding process, a substantially tubular parison or "preform" is provided, said preform being fabricated from a thermoplastic and having an open end near a mouth and a closed end opposite the open end. The preform is disposed within a mold having a cavity substantially defining the form and contours of a container.

The preform is expanded into the cavity of the mold by the action of a stretching rod inserted into a mouth of the preform, combined with the action of a working fluid injected into the preform under pressure. The stretching rod is advanced into the preform and presses against an opposite interior surface, stretching it longitudinally into the mold. The pressurized fluid causes the preform to inflate, expanding primarily radially.

Conventionally, the pressurized fluid injected during the molding of the container is air that can be heated to facilitate the deformation of the preform. However, it is known to use a liquid as the working fluid, preferably the liquid which is ultimately to be packaged within the container. In this way, the process of forming a container and filling it with a product are effectively combined, realizing great advantages in equipment cost and production efficiency compared to an air-injection stretch blow molding system.

In a combined forming-filling container fabrication process, it is important to ensure that the preform is fully expanded into the cavity of the mold and that all of the contours of the resulting container are fully formed. As full expansion of the preform thereby leading to the container results from both stretching and filling operations, it is necessary to link the launch of the stretching, the liquid supply and filling operations in order to supply the liquid at the right moment according to the position of the stretch rod within the preform.

The stretching and filling operations are realized using an injection head configured to interface with the mouth of the preform and with the stretch rod displacement and to establish fluid communication between a fluid supply and the mouth of the preform.

Usually the injection head comprises an injection valve disposed within the outer shell of the injection head and configured to selectively permit fluid communication through the injection head. In an opened position the injection valve allows the fluid to be displaced from the injection head to the preform whereas in a closed position no fluid is transferred to the preform.

In this example, the supply of the liquid to the injection head step and the injection valve's opening allowing displacement of the liquid from the injection head to the preform, are two independent operations that need to be timely coordinated. This coordination is difficult to maintain over time due to the time response of the different components.

First of all, it has to be noted that the time response of the injection valve is evolving due to the wear of the valve and a necessary reset of this synchronization will have to be made periodically.

Secondly, each single valve has a different time response due to manufacturing tolerance meaning that each time the valve is changed the synchronization has to be reset.

One solution currently implemented in the prior art is to electronically control the launch of the two steps: fluid supply and opening of the injection valve.

Even though this solution looks acceptable it is complex to implement mainly due to the time response of the valve leading to a time shift between the two steps. This shift creates difficulties in the process and possible damages.

Indeed, if the injection valve is opened while the fluid has not been supplied to the injection head, only the water remaining in the injection head will be transferred to the preform which will lead to cooling the preform down and to its breakage.

On the other hand, if the fluid is supplied to the injection head and the injection valve is opened too late, the apparatus will undergo important internal pressure possibly damaging the whole system.

It is therefore an object of this invention to provide an injection head, an apparatus and related method for fabricating and filling a beverage container which accurately provides full and effective time coordination of the liquid's supply step and injection valve's opening without the disadvantageous aspects of the apparatuses known in the art.

SUMMARY OF THE INVENTION

In one respect, the invention provides an injection head for the fabrication of a container.

According, therefore, to a first aspect, the invention is drawn to an injection head for the fabrication of a container from a preform accommodated within a mold cavity in the form of a container, said preform having a closed first end thereby defining a preform cavity and an opened second end defining a mouth, said injection head being configured to interface with the mouth of the preform and to establish fluid communication between a liquid supply and said mouth, in which the injection head further comprises an injection valve disposed within the outer shell of the injection head and configured to selectively permit fluid communication through said injection head upon displacement between an opened and a closed position; an injection head cavity disposed between the injection valve and the outer shell of the injection head and connected to the liquid supply, liquid supply control means, and control means of the injection valve's opening thereby allowing fluid communication through the injection head.

According to another aspect of the invention, the control means of the injection valve's opening comprise activation means of said injection head, said activation means being activated by the liquid under pressure once the pressure in the injection head cavity grows up due to the opening of the liquid supply.

This is advantageous in that an injection head so configured will provide a mechanical servo-control between the supply of the liquid to the injection head and the injection valve's opening thereby linking the two operations without encountering the disadvantageous aspects of the apparatuses known in the prior art.

By providing such activations means, one realizes a very high degree of accuracy in the control and coordination of the two above mentioned operations required to hydraulically blow mold a container.

Specifically, the mechanical servo control of the two operations allows having a fixed time between the two operations and will not lead to time shift and delay in the process.

This realizes much more accurate results than the apparatuses known in the art which necessarily employ electronic control of the different operations, which each introduce the opportunity for variation in time response of the different components.

Furthermore, the provision of using a mechanical servo control renders the operation of the apparatus more reliable and economical than those known in the art, in that it eliminates the need of regularly checking the time response of the valves and changing them if needed.

According to a first feature, the activation means of the injection head comprise supporting portions disposed in the injection head cavity.

This is advantageous in that the liquid is directly acting on the activation means when introduced under pressure in the injection head cavity without intermediate elements.

This configuration allows accuracy and responsiveness of the activation means and the flexibility of their positioning within the injection head cavity.

According to a further feature, the supporting portions of the activation means are disposed on the surface of the injection valve disposed in the injection head cavity and the liquid stored in the injection head cavity leans against said supporting portions with a force F1.

This is advantageous in that the liquid, upon its action, directly participates to the opening of the injection valve. This will prevent external factors to disrupt the process leading to the opening of the injection valve. The accuracy and reliability of the process and apparatus are thereby improved.

According to another further feature, the supporting portions are chamfers disposed on the injection valve along its direction of displacement and/or along its circumference. This specific shape of the supporting portions is advantageously designed for the liquid to act in an efficient way on the injection valve.

According to another further feature, the injection head further comprises a closing spring urging on the injection valve with a force F2 to maintain it in closed position, said closing spring allowing a first displacement (d) of the injection valve towards its opened position when the force F1 applied by the liquid on the supporting portions is greater than the force F2 of the closing spring.

This is advantageous in that the injection valve is first displaced in an automatic way with the liquid directly acting on the activation means.

In addition to the previous features, the injection head further comprises valve opening means actuated by the activation means and configured to displace the injection valve towards its opened position. The valve opening means is providing full opening of the injection valve once the activations means have provided a first displacement (d) of the injection valve. Indeed the sole force of the liquid under pressure is not enough to allow full opening of the injection valve. These complementary means for the opening of the valve are mechanically coordinated with the action of the liquid on the injection valve which avoids time loss in the process time and increase the reliability of the process.

According to a further feature of the valve opening means, said valve opening means comprise a pressurized air valve which is set off further to the first displacement (d) of the injection valve, said pressurized air valve configured to allow air in a first chamber of the injection head thereby releasing of the injection valve in the opened position. The use of a pressurized air valve is improving the opening speed of the injection valve. This parameter is of great importance in the process as the liquid has to be release with in a very short time in the preform in order to correctly expand it.

In addition to the above mentioned features, the injection head further comprises valve closing means configured to displace the injection valve towards its closed position.

Advantageously, said valve closing means comprises means for allowing air in a second chamber of the injection head and/or means for removing air from the first chamber of the injection head.

According to a second aspect, the invention is drawn to an apparatus for the fabrication of a container comprising a mold defining a mold cavity in the form of a container, and being further configured to accommodate a substantially tubular preform having a closed first end and defining a preform cavity communicating with a mouth at an open second end; a stretching rod being mobile relative to the preform along a longitudinal axis of said preform and configured to press against an interior surface of said preform at the closed first end thereof; and an injection head as previously disclosed.

The disclosed apparatus is advantageous in that it uses the injection head of the invention in combination with a mold and stretching rod for the hydraulic blow molding of a plastic container.

According to a third aspect, the invention is drawn to a method for the fabrication of a container, comprising the steps of:
a) providing a substantially tubular preform, said preform having a closed first end and defining a preform cavity communicating with a mouth at an open second end;
b) disposing the preform at least partially within a mold being provided with a mold cavity substantially defining the form of a container;
c) positioning an injection head upon the mouth of the preform, said injection head establishing fluid communication between said mouth and a liquid source;
d) supplying liquid to an injection head cavity disposed within the injection head, said liquid activating the opening of an injection valve, said injection valve configured to selectively permitting fluid communication through said injection head;
e) injecting a volume of liquid into the preform cavity of the preform said preform being thus induced to expand into the contours of the mold cavity and produce a container;
f) closing the injection valve, thereby blocking fluid communication between the liquid source and the container;
g) withdrawing the injection head and
f) taking the container out of the mold.

This is advantageous in that fabricating a container by such a method will realize the advantages of the injection head and apparatus described above in the fabrication and filling of containers. This method produces fabricated and filled containers, ready for sealing, labeling, and distribution, without implicating the complex mechanisms required to coordinate the necessary operations for the opening of the injection valve of the prior art.

Furthermore, the mechanical servo-control between the supply of the liquid to the injection head and the injection valve's opening improves the control and progress of the different operations of the global forming and filling process.

Specifically, it allows avoiding time shift between the steps of supplying of the liquid to the injection head and the injection valve's opening as previously existing in the prior art.

According a feature of said method, when supplying liquid to the injection head cavity, said liquid is leaning on supporting portions of the injection valve thereby enabling a first displacement of the injection valve, said first displacement actuating valve opening means.

According to a further feature of said method the closing of the injection valve is realized by injection valve closing means configured to displace the injection valve towards its closed position.

According to a first embodiment of the injection valve closing means, the closing of the injection valve is realized by opening a pressurized air supply device also referenced as closing valve to allow pressurized air in a second chamber of the injection head, said pressurized air pushing the injection valve towards its closed position.

Alternatively and/or additionally, the injection valve closing means uses a pressurized air extraction device to expel air from a first chamber of the injection head, said expelling of the air contained in the first chamber allows the injection valve to move towards its closed position thanks to the closing spring.

Additionally, said method comprises a further step of inserting a stretching rod into the preform cavity through the mouth of the preform prior to injecting a volume of liquid into the preform, the stretching rod being pressed into an interior surface of the closed first end of the preform.

According to a fourth aspect, the invention is drawn to a container produced by the method as described above.

This is advantageous in that such a container will embody the advantages of the method as described above.

Other particularities and advantages of the invention will also emerge from the following description.

BRIEF DESCRIPTION OF THE DRAWINGS

Embodiments incorporating the principles of the present invention will now be described, by way of examples, with reference to the accompanying figures in which.

DETAILED DESCRIPTION

Figure 1A:
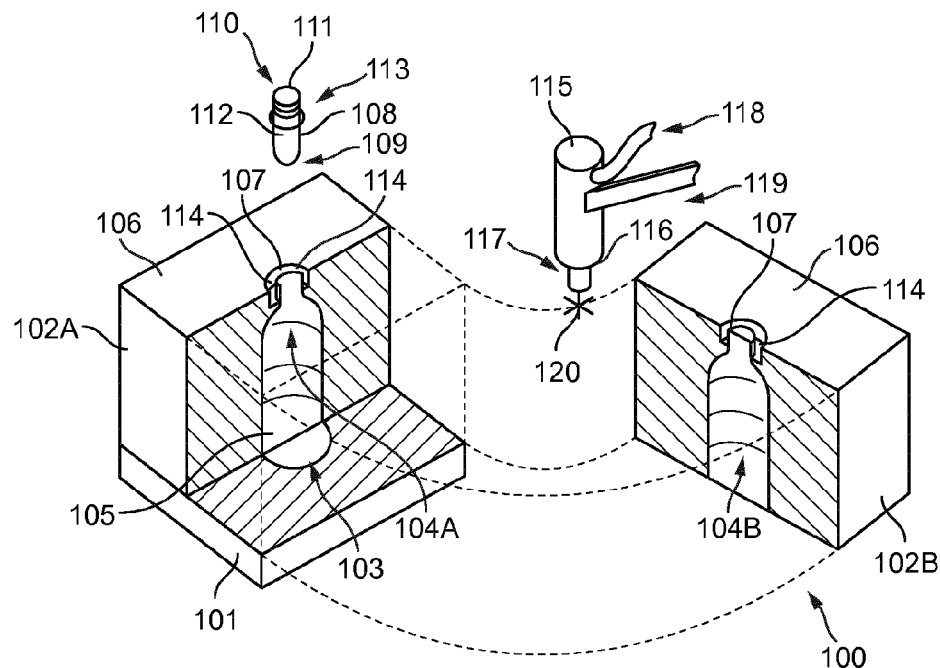
FIGS. 1A and 1B are perspective depictions of an exemplary stretch blow molding apparatus, in a partially-exploded and assembled disposition, respectively according to the prior art.
Figure 1B:
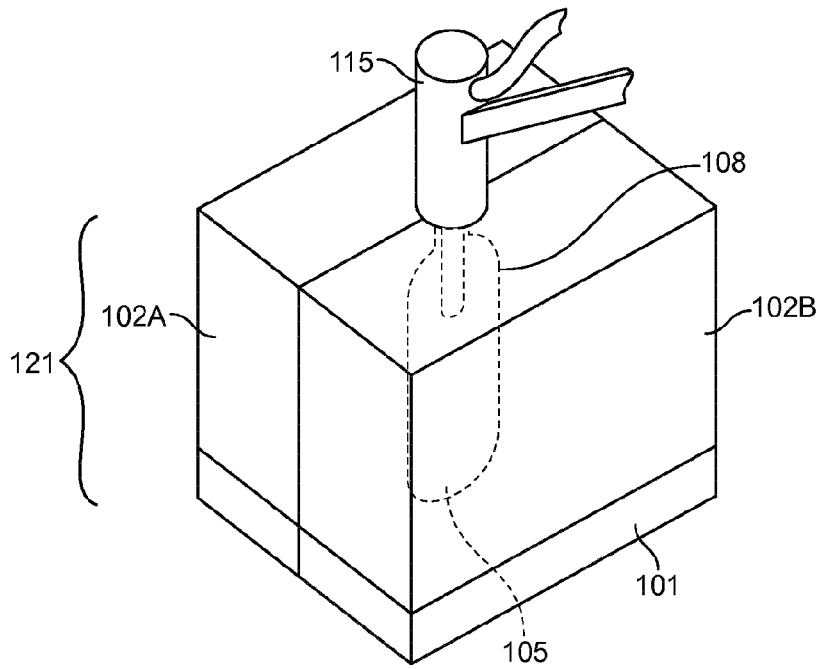

FIGS. 1A and 1B are perspective views of an exemplary stretch blow molding apparatus 100 according to the prior art. FIG. 1A depicts the apparatus in a partially-exploded disposition. The apparatus 100 comprises a base mold segment 101 and the two lateral mold segments 102A and 102B. The base mold segment 101 is provided with a base depression 103 substantially defining the base of a container, while the lateral mold segments 102A and 102B are respectively provided with the lateral depressions 104A and 104B, each substantially defining half of the body of a container. The base depression 103 and lateral depressions 104 together form the mold cavity 105, which substantially defines the form of a container.

The lateral depressions 104A and 104B each communicate with a top face 106 of their respective lateral mold segments 102A and 102B, cooperating to form a mold hole 107 communicating with the mold cavity 105. Into the mold hole 107 is disposed a preform 108, which is substantially tube-shaped and comprises a closed end 109 and a mouth 110 at an open end 111 communicating with a preform cavity 112 within said preform 108.

In this embodiment the mold segments 101, 102A, and 102B are depicted as substantially independent components, each being capable of a full range of motion independent from the other two. It may be preferable, however, to provide linkages or other such connections between the mold segments so as to restrict their range of motion relative to each other, or to provide that the mold segments are linked together by means such as rails or sliders.

In FIG. 1A the preform 108 is shown removed from the mold cavity 105 for clarity; however, it should be understood that the preform 108 is disposed so that it is substantially within the mold cavity 105. Preferably, the preform 108 is provided with a flange 113, which will rest on the top faces 106 of the lateral mold segments 102. The top faces 106 may be further provided with a preform seat 114 disposed about the mold hole 107, which locates the flange 113 of the preform 108, positioning and centering the preform 108 within the mold cavity 105. Preferably, the open end 111 of the preform 108 protrudes from the top faces 106 of the lateral mold segments 102A and 102B, while the rest of the preform 108 is thus disposed within the mold cavity 105 defined by the base depression 103 and lateral depressions 104.

The apparatus 100 further comprises an injection head 115. The injection head 115 is provided with a nozzle 116 which is configured to mate with the mouth 110 of the preform 108 and create a fluid-tight seal therewith. The injection head 115 is further provided with a stretching rod 117, here depicted slightly extended from the nozzle 116. The injection head 115 is connected to a fluid supply 118, such that a volume of fluid may be conducted from said fluid supply 118 through the injection head 115 and out the nozzle 116. The fluid supply 118 is controlled by an injection valve, which may be disposed within the injection head 115 as here, or optionally outboard of the injection head, for example in a pumping unit or other such fluid handling system.

Furthermore, In FIG. 1A, the injection head 115 is affixed by the arm 119 to a positioning mechanism, such that it may translate in each of the six principal axes 120 and position itself upon the mouth 110 of the preform 108. However, it should be understood that the injection head 115 need not necessarily be so configured: depending on the integration of the molding apparatus 100 into the production line as a whole and the configuration of the molding apparatus in particular, it may only be necessary to provide, for example, a means for the injection head 115 to translate along a vertical axis relative to the mold segments 101 and 102. The exact configuration of the apparatus may be determined by one skilled in the art, according to the particular demands of the implementation.

FIG. 1B depicts the mold apparatus in an assembled disposition, with the mold segments 101, 102A, and 102B brought together in abutment to form the mold 121 which defines the mold cavity 105. The preform 108 is disposed substantially within the mold cavity 105, and the injection head 115 is positioned over the mouth (not shown) of the preform 108 which protrudes from the mold cavity 105. At this point, the injection head 115 is ready to inject a quantity of liquid into the preform 108 and expand it into the contours of the mold cavity 105, forming a container.

Figure 2:
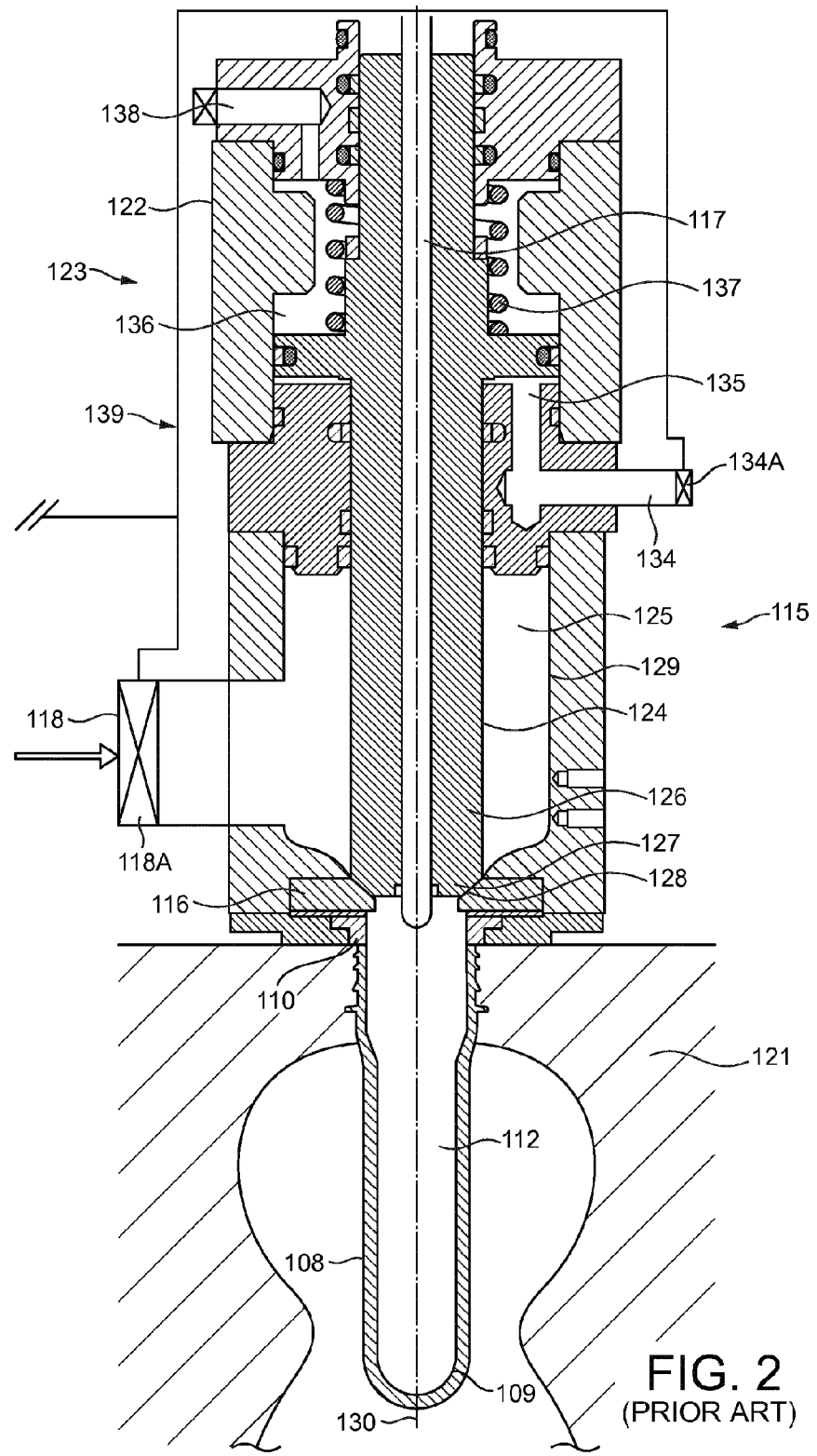
FIG. 2 is an orthogonal section view of an injection head of the prior art, having an injection valve in its closed position.

FIG. 2 depicts an orthogonal section view of an injection head according to the prior art, having an injection valve in its closed position and applicable to the device of FIGS. 1A and 1B.

The injection head 115 depicted in FIG. 2 in a closed state as prior to an injecting step.

As shown in FIG. 2 the injection head 115 comprises an outer shell 122, comprising generally a body section 123 and the nozzle 116, the latter being configured to mate with the mouth 110 of the preform 108 and communicate with a preform cavity 112 within said preform 108 as described above.

The injection head 115 further comprises the injection valve 124, disposed within the outer shell 122 and defining the injection head cavity 125 between the two. The injection head cavity 125 is connected to a liquid reservoir (not presented) via a fluid supply 118. The injection head cavity 125 is thus provided in fluid communication with the nozzle 116 when the injection valve is in an opened position (not shown).

The injection head 115 also comprises a pressurized air valve 134 allowing air in a first chamber 135 of the injection head 115. Said pressurized air is acting against a closing spring 137 of the injection valve 124 and disposed in a second chamber 136 of the injection head 115, in order to displace the injection valve towards its opened position. Both first 135 and second 136 chamber are disposed within the outer shell 122 between said outer shell 122 and the injection valve 124.

In order to close the injection valve 124, the injection head 115 also comprises a closing valve 138.

Both pressurized air valve 134 and fluid supply 118 comprise control means 134a, 118a. Both control means are linked together and together electronically controlled by a control line 139.

The injection valve 124 is comprised of a valve body 126 having a cross shape and which is provided with a taper 127 at said nozzle 116, and a valve seat 128 formed from a portion of an inner wall 129 of the outer shell 122 configured to mate with the taper 127. When in the closed position as shown in FIG. 2, the valve body 126 will thus block fluid communication between the injection heat cavity 125 and the preform cavity 112.

A fluid-tightness between the injection head 115 and the preform 108 is provided in order to avoid liquid loss during blow molding process.

The injection head 115 is also provided with a stretching rod 117. The stretching rod 117 is disposed coaxially within the valve body 126 and is configured to be independently mobile relative to the valve body 126. The valve body 126 is itself disposed coaxially with the valve seat 128 and the nozzle 116, such that the entire group of nozzle 116, valve body 126, valve seat 128, and stretching rod 117 are disposed in alignment along the longitudinal axis 130. The stretching rod 117 is preferably displaced by an electric actuator, though other means such as hydraulic cylinders, pneumatic actuators, and the like may alternately be employed.

FIG. 2 shows the injection head 115 prior to an injecting step. The valve body 126 is seated in the valve seat 128, blocking fluid communication through the injection head 115 and preventing flow of the liquid through the nozzle 116. The stretching rod 117 is retracted within the injection head 115.

Prior to an injecting step, the stretching rod 117 is advanced into the cavity 112. The stretching rod 117 is advanced into the closed end 109 of the preform 108 and causes the preform to stretch along the longitudinal axis 130.

When the stretch rod reaches a predetermined position, the injection head cavity 125 is supplied with liquid under pressure and the pressurized air valve 134 is activated. The valve body 126 is retracted from the valve seat 128, permitting the liquid to flow through the nozzle 116 of the injection head. The liquid under pressure is injected into the cavity 112 of the preform 108, further expanding the preform 108 and causing it to assume the form of the mold cavity 121 in which it is disposed.

The stretching rod 117 is then retracted in the injection head 115 and the valve body 126 displaced in contact with the valve seat 128 thereby closing the injection valve 124.

Valve closing means 138, linked to control line 139, are provided for controlling closing of the injection valve 124.

The stretching, the liquid supply, valve opening and closing and expansion operations are controlled and coordinated by a central controller using the control line 139.

FIGS. 3, 3A, 4, 4A and 5, 5A are a series of orthogonal section views with enlarged representation (A figures) depicting an injection head according to the invention, before, during, and at the end of the opening of the injection valve of a forming and filling container process.

Figure 3:
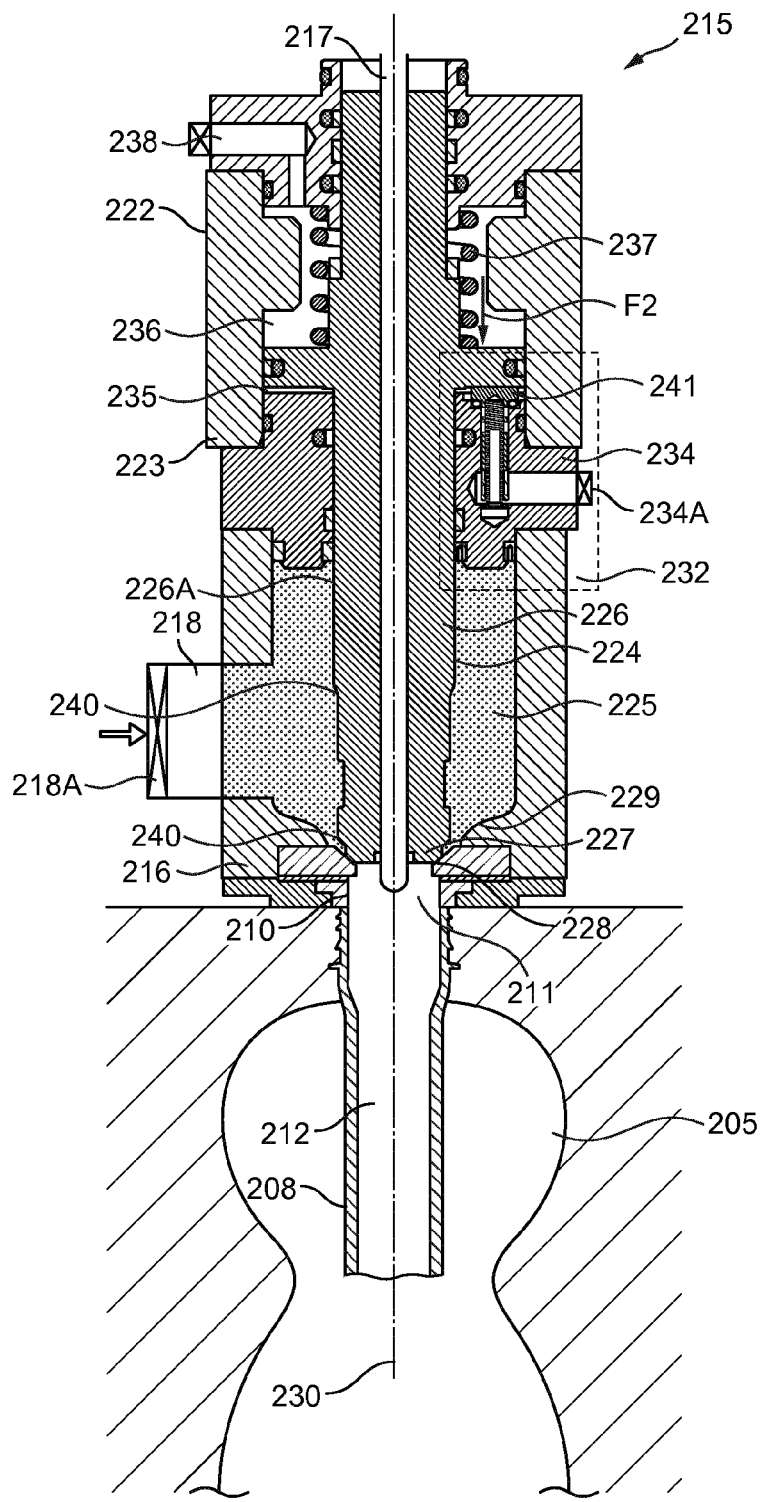
FIGS. 3, 3A, 4, 4A and 5, 5A are a series with enlarged representation (A figures) of orthogonal section views depicting an injection head according to the invention, before, during, and at the end of the opening of the injection valve.
Figure 4:
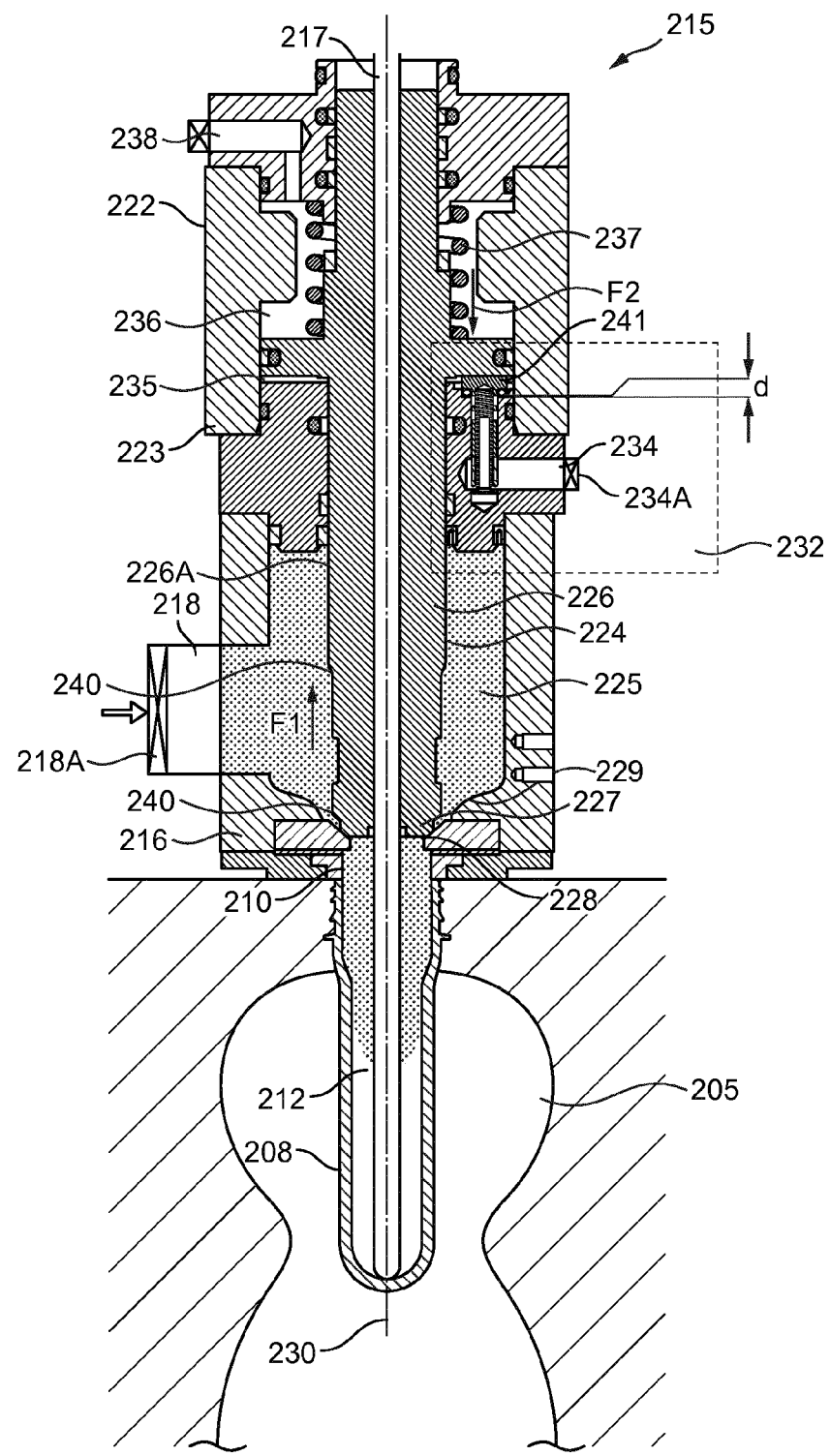
Figure 5:
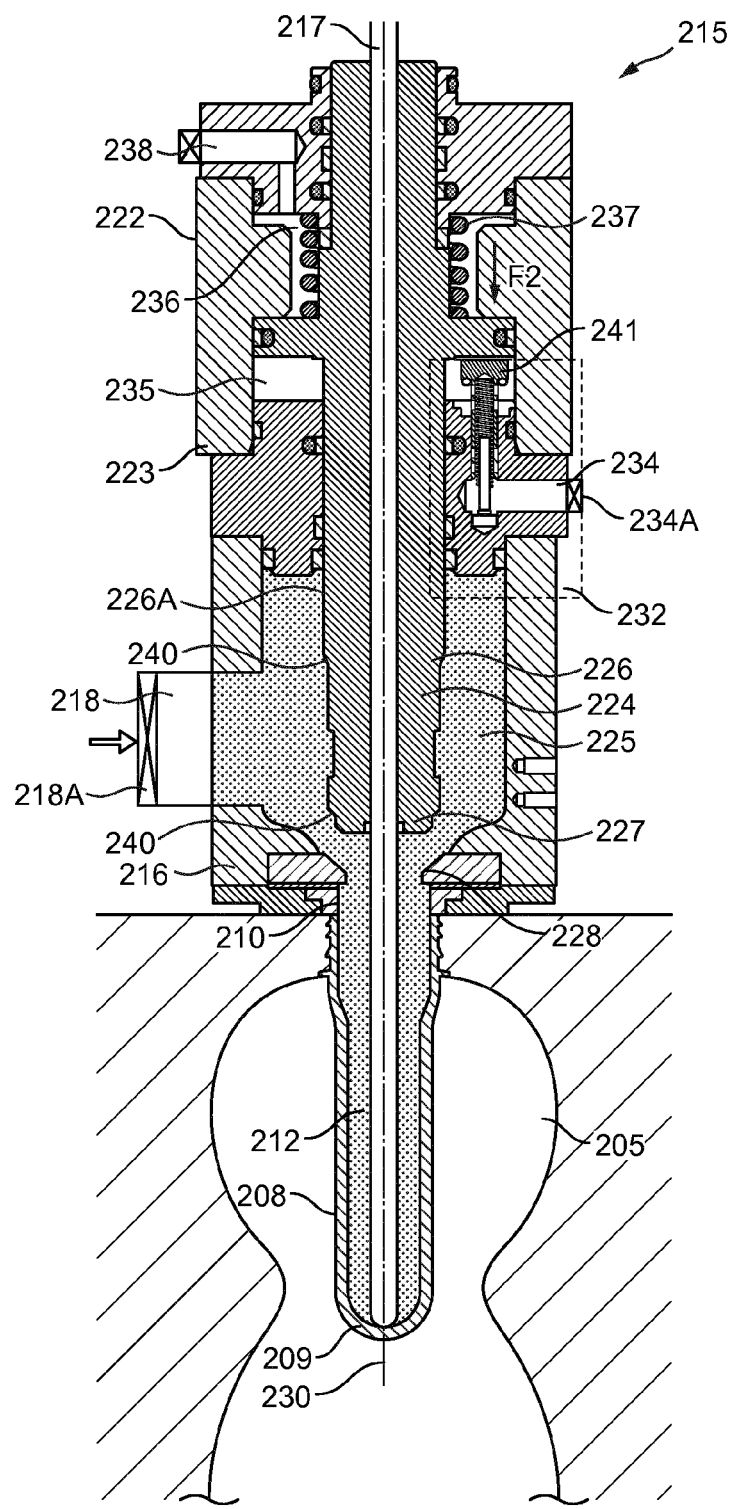
Figure 5A:
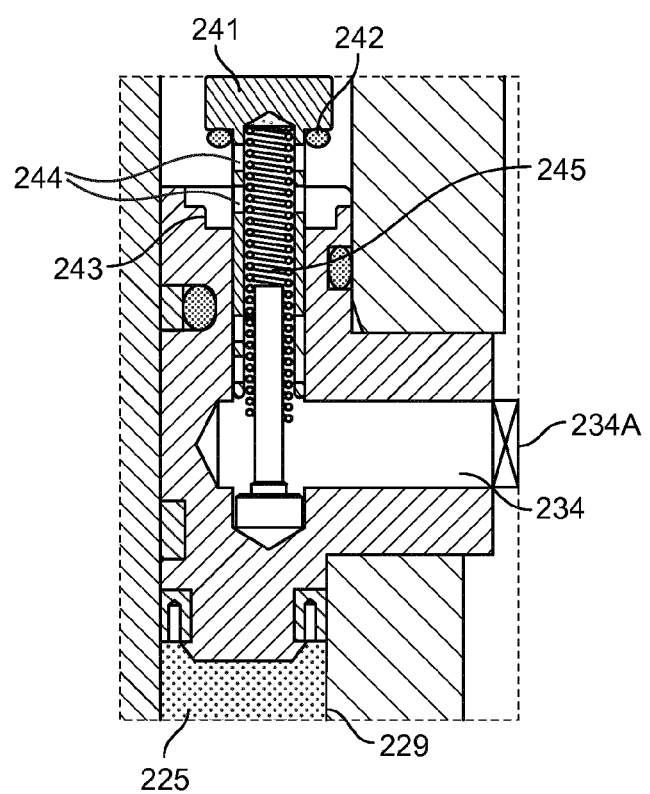

The general construction of the injection head 215 of FIGS. 3 to 5 is similar to the injection head 115 depicted in FIG. 2, the only references are changing.

FIGS. 3 to 5 are presenting an injection head 215 comprising an injection valve 234, and a preform 208 for a one step forming and filling of a container process.

FIG. 3 depicts the injection head 215 and preform 208 during the step of providing liquid to the injection head cavity.

FIG. 4 depicts the injection head 215 and preform 208 during the step of opening the injection valve.

FIG. 5 depicts the injection head 215 and preform 208 when the injection valve is in the opened position and the preform full of liquid before expansion.

As shown in FIGS. 3 to 5 the injection head 215 comprises an outer shell 222, comprising generally a body section 223 and a nozzle 216, the latter being configured to mate with the mouth 210 of a preform 208 and communicate with a preform cavity 212 within said preform 208 as described above.

The injection head 215 further comprises an injection valve 224, disposed within the outer shell 222 and defining the injection head cavity 225 between the two. The injection head cavity 225 is connected to a liquid reservoir (not presented) via a fluid supply 218. The fluid supply 218 is controlled via liquid supply control means 218a. The injection head cavity 225 is thus provided in fluid communication with the nozzle 216 when the injection valve is in an opened position (FIG. 5).

The injection head 215 also comprises valve opening means 232. The valve opening means is a pressurized air valve 234. Said pressurized air valve comprises a pressurized air valve seat 241 disposed in a first chamber 235 of the injection head 215.

The pressure in the first chamber 235 comes from the pressurized air valve 234. Said pressurized air valve 234 acts against a closing spring 237 of the injection valve 224 disposed in a second chamber 236 of the injection head 215, in order to displace the injection valve towards its opened position. The pressurized air valve 234 comprises control means 234a.

Both first 235 and second 236 chamber are disposed in the same way as disclosed in FIG. 2.

Injection valve closing means comprising a closing valve 238 are provided in the injection head 215 to close the injection valve 224.

As already disclosed in the frame of FIG. 2, the injection valve 224 is comprised of the valve body 226 which is provided with a taper 227 at said nozzle 216, and a valve seat 228 formed from a portion of an inner wall 229 of the outer shell 222 configured to mate with the taper 227. When in the closed position as shown in FIG. 3, the valve body 226 thus blocks fluid communication between the injection head cavity 225 and the preform cavity 212.

A fluid-tightness between the injection head 215 and the preform 208 is provided in order to avoid liquid loss during the injection step.

The injection head 215 is also provided with a stretching rod 217. The stretching rod 217 is disposed coaxially within the valve body 226 and is configured to be independently mobile relative to the valve body 226. The valve body 226 is itself disposed coaxially with the valve seat 228 and the nozzle 216, such that the entire group of nozzle 216, valve body 226, valve seat 228, and stretching rod 217 are disposed in alignment along the longitudinal axis 230. The stretching rod 217 is preferably displaced by an electric actuator (not shown), though other means such as hydraulic cylinders, pneumatic actuators, and the like may alternately be employed.

FIG. 3 shows the injection head 215 prior to an injecting step. The valve body 226 is seated on the valve seat 228, blocking fluid communication through the injection head 215 and preventing flow of the liquid through the nozzle 216. The stretching rod 217 is retracted within the injection head 215.

According to the invention, the injection head 215 comprises activation means 240 of the injection valve's opening means, said activation means being activated by the liquid under pressure in the injection head cavity 225 when liquid supply 218 is opened.

The activation means comprise supporting portions 240 disposed on the valve body surface 226a in the injection head cavity 225.

This leads to a valve body 226 having changing outlines between a minimum diameter $D_{min}$ and a maximum diameter $D_{max}$.

In the present embodiment the supporting portions 240 have chamfer configurations with decreasing slope in the direction of the valve seat 228.

Figure 3A:
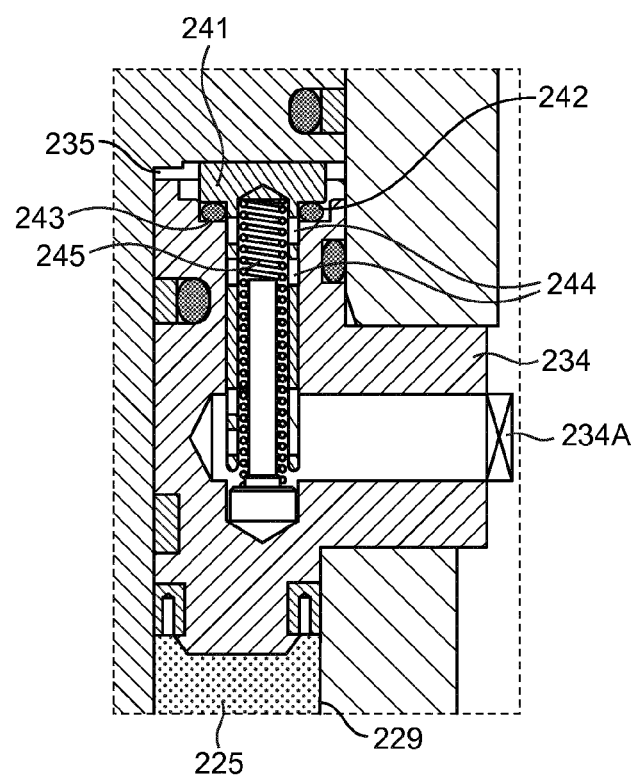

In FIG. 3, and as more visible on FIG. 3A presenting a detailed view of the pressurized air valve 234 in a closed position, the pressurized air valve seat 241 is urged against a wall 243 of the first chamber supplied on the injection head 215 prohibiting pressurized air to enter the first chamber.

The pressurized air valve 234 further comprises air openings 244 which in this position of the pressurized air valve 234 are not in air communication with the first chamber 235.

Sealing elements 242 are further provided on the pressurized air valve seat 241 in order to enhance air-tightness.

Pressurized air valve seat 241 is indirectly urged against the wall of the first chamber by closing spring 237. In the proposed embodiment closing spring 237 is acting against the injection valve 224 which urged the air valve seat 241 against the wall 243. A spring air supply 245 of the pressurized air valve 234 is positioned in a retracted position.

In this configuration, no air is transferred from the pressurized air valve 234 to the first chamber 235 of the injection head 215 through the air openings 244.

According to the invention and as represented in FIGS. 3 and 4, the liquid supply 218 is opened and the liquid in the injection head is under pressure.

Said liquid is then bearing against the chamfer surfaces of the supporting portions 240.

Specifically in FIG. 4 presenting the injection head 215 at the beginning of the opening of the injection valve 224, the liquid under pressure in the injection head cavity 225 exerts a force FI resulting from cumulated pressure forces applied on all the chamfers of the supporting portions 240, in the direction opposite to the injection valve seat 228.

Force F1 is acting against the force F2 of the closing spring 237 of the injection valve 124 and when force F1 becomes greater than force F2, the valve body 226 is displaced in the direction of the injection valve's opening of a distance d (FIG. 4).

Said displacement d actuates the valve opening means 232 by allowing the pressurized air valve seat 241 to move away from the wall 243 of the first chamber and releasing the spring air supply 245 thereby allowing pressured air to enter in the first chamber 235 via the air openings 244 of the pressurized air valve 234.

Figure 4A:
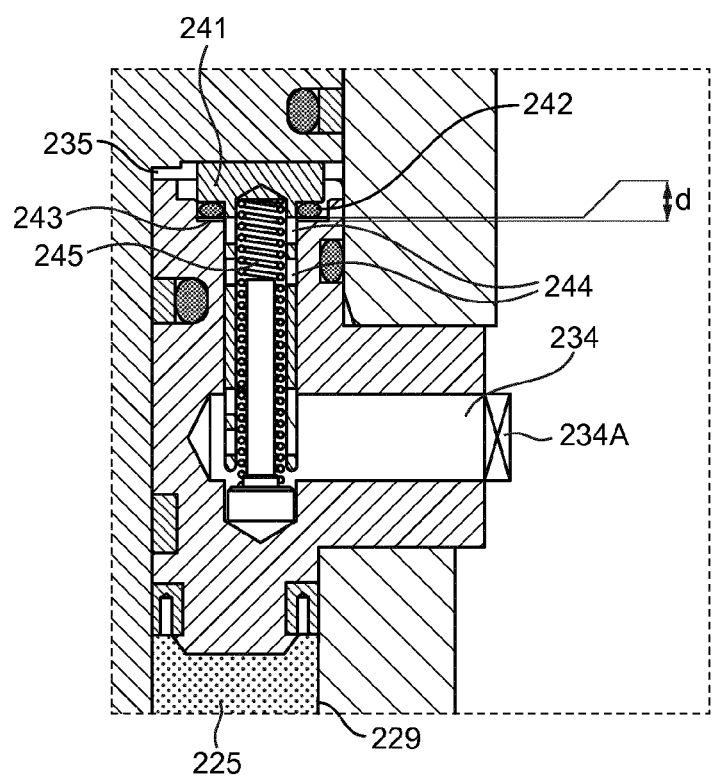

As can be seen from FIG. 4A, in this position of the pressurized air valve 234, pressurized air is allowed in first chamber 235 and the injection valve 224 is moved towards its opening position: the valve body 226 is retracted from the valve seat 228, permitting the liquid to flow through the nozzle 216 of the injection head. The liquid under pressure is injected into the cavity 212 of the preform 208 (FIG. 5) for further expansion of the preform 208 and causing it to assume the form of the mold cavity (not shown) in which it is disposed.

FIG. 5 shows the injection head 215 and preform 208 when the injection valve is in the opened position and the preform full of liquid before expansion.

In this configuration, the spring air supply 245 is fully released and the air openings 244 are in air communication with the first chamber which is then full of pressurized air. The pressurized air acts against the closing spring 237 and maintains the injection valve 224 in the opened position.

The preform 208 is full of liquid and ready for expansion.

The displacement and the action of the stretch rod 217 and its time coordination with the injection steps are not detailed in order to simplify the explanations of the injection head activation means but the stretch rod 217 has the same function and way of working as the ones presented in the frame of FIG. 2.

Once the preform fully expanded in the form of a container, the liquid supply is stopped and there is no more pressure of the liquid on the activation means 240.

The injection head 215 further comprises injection valve closing means configured to displace the injection valve 224 towards its closed position.

According to the invention, said injection valve closing means comprises means for allowing air in the second chamber 236 of the injection head 215.

The means for allowing air in the second chamber 236 is the closing valve 238. Said closing valve 238 is activated when the injection step is finished and when there is not more pressure applied on the activation means 240.

The closing valve 238 is bringing pressurized air in the second chamber 236 thereby pushing the valve body 226 towards its closed position.

The displacement of the valve body automatically closes the pressurized air valve 234.

In addition or alternatively under controlled sequence, the valve closing means comprise means for removing air from the first chamber 235 of the injection head. Said means for removing air from the first chamber of the injection head 215 are made of the pressurized air valve 234 working in a reverse way i.e. expelling the pressured air of the first chamber 235 out of the injection head 215.

In the end, the valve body 226 is displaced in contact with the valve seat 228 thereby closing the injection valve 224.

The injection head 215 is ready for a new process cycle.

The filled container may further be sealed or capped, labeled, and/or packaged for distribution.

In a summarized exemplary of the method of the invention, the fabrication of a container comprises the following steps of:
- a—providing a substantially tubular preform 208, said preform having a closed first end 209 and defining a preform cavity 212 communicating with a mouth 210 at an open second end 211;
- b—disposing the preform 208 at least partially within a mold being provided with a mold cavity 205 substantially defining the form of a container;
- c—positioning an injection head 215 upon the mouth 210 of the preform 208, said injection head 215 establishing fluid communication between said mouth 210 and a liquid source 218;
- d—supplying liquid to an injection head cavity 225 disposed within the injection head 215 for activating the opening of an injection valve 224 configured to selectively permitting fluid communication through said injection head 215, said liquid stored under pressure in the injection head cavity 225 leaning on supporting portions 240 disposed on the injection valve 224 thereby enabling a first displacement d of the injection valve 224, said first displacement actuating valve opening means 232,
- e—injecting a volume of liquid into the preform cavity 212 of the preform 208, said preform 208 being thus induced to expand into the contours of the mold cavity 205 and produce a container;
- f—closing the injection valve 224 by opening a pressurized air supply valve 238 to allow pressurized air in a second chamber 236 of the injection head 215 and/or actuating a pressurized air extraction valve 234 to expel air from a first chamber 235 of the injection head 215, both actions bringing the injection valve 224 towards its closed position, thereby blocking fluid communication between the liquid source 218 and the container;
- g—withdrawing the injection head 215, and
- h—taking the produced and filled container out of the mold.

As can be seen from the present description there are many advantages in using the disclosed mechanical servo-control between the supply of the liquid to the injection head and the opening of the injection valve.

Of course, the invention is not limited to the embodiments described above and in the accompanying drawings. Modifications remain possible, particularly as to the construction of the various elements or by substitution of technical equivalents, without thereby departing from the scope of protection of the invention.

In particular, the exact sizes and shapes of the elements discussed in the foregoing description may be varied according to the particularities of the application in which the invention is to be employed. For instance, the dimensions and configuration of the injection head, injection valve, activation means and stretching rod may be adapted to achieve optimal results in any particular application, while still embodying the inventive principle of this invention.

The exact configuration and operation of the invention as practiced may thus vary from the foregoing description without departing from the inventive principle described therein. Accordingly, the scope of this disclosure is intended to be exemplary rather than limiting, and the scope of this invention is defined by any claims that stem at least in part from it.

The invention claimed is:

1. An injection head for the fabrication of a container from a preform accommodated within a mold cavity in the form of a container, the preform having a closed first end thereby defining a preform cavity and an opened second end defining a mouth, the injection head comprising:
   an outer shell;
   an interface configured to interface with the mouth of the preform and establish fluid communication between a liquid supply and the mouth, an injection valve disposed within the outer shell of the injection head and configured to selectively permit fluid communication through the injection head upon displacement of the injection valve between an opened position and a closed position;
   an injection head cavity defined between the injection valve and the outer shell of the injection head, the injection head cavity being fluidly connected to the liquid supply;
   liquid supply control means, and
   control mechanism configured to control the injection valve's opening thereby allowing fluid communication through the injection head,
   the control mechanism of the injection valve's opening including an actuator configured to be activated by the liquid under pressure in the injection head cavity when liquid supply is opened.

2. The injection head according to claim 1, wherein the actuator includes supporting portions disposed in the injection head cavity.

3. The injection head according to claim 2, wherein the supporting portions are disposed on a surface of the injection valve and disposed in the injection head cavity, the liquid stored in the injection head cavity bearing against the supporting portions with a force F1.

4. The injection head according to claim 3, wherein the supporting portions are chamfers disposed on the injection valve along at least one of the injection valve's direction of displacement and circumference.

5. The injection head according to claim 3, wherein the injection head further comprises a closing spring urging the injection valve with a force F2 into the closed position, the closing spring allowing a first displacement (d) of the injection valve in a direction towards the opened position when the force F1 applied by the liquid on the supporting portions is greater than the force F2 of the closing spring.

6. The injection head according to claim 1, wherein the injection head further comprises a valve opening mechanism actuated by the actuator and configured to further displace the injection valve towards the opened position.

7. The injection head according to claim 6, wherein the valve opening mechanism is a pressurized air valve which is set off further to the first displacement (d) of the injection valve, the pressurized air valve having an open position communicating air in a first chamber of the injection head displacing the injection valve into the opened position.

8. The injection head according to claim 1, wherein the injection head further includes valve closing mechanism configured to displace the injection valve towards its closed position.

9. The injection head according to claim 8, wherein the valve closing mechanism including a second chamber in the injection head configured to effectuate at least one of displacement of the injection valve toward the closed position and removing of air from a first chamber of the injection head.

10. An apparatus for the fabrication of a container, comprising:
   a mold defining a mold cavity in the form of a container, and being further configured to accommodate a substantially tubular preform (having a closed first end and defining a preform cavity communicating with a mouth at an open second end;
   a stretching rod moveable relative to the preform along a longitudinal axis of the preform and configured to press against an interior surface of the preform at the closed first end; and
   an injection head according to claim 9.

11. A method for the fabrication of a container, comprising the steps of:
   a) providing a substantially tubular preform, the preform having a closed first end and defining a preform cavity communicating with a mouth at an open second end;
   b) disposing the preform at least partially within a mold having a mold cavity substantially defining the form of the container;
   c) positioning an injection head upon the mouth of the preform, said injection head establishing fluid communication between the mouth and a liquid source;
   d) supplying liquid under pressure into an injection head cavity disposed within the injection head, the liquid activating the opening of an injection valve, the injection valve configured to selectively permitting fluid communication through the injection head;
   e) injecting a volume of liquid into the preform cavity inducing the preform to expand into the form defined by the mold cavity and to produce a container;
   f) closing the injection valve, thereby blocking fluid communication between the liquid source and the container;
   g) withdrawing the injection head and
   h) taking the container out of the mold.

12. The method for the fabrication of a container according to claim 11, wherein when supplying liquid to the injection head cavity the liquid bears upon supporting portions of the injection valve thereby enabling a first displacement (distance d) of the injection valve, the first displacement actuating a valve opening mechanism.

13. The method for the fabrication of a container according to claim 11, wherein the step of closing the injection valve includes opening a pressurized air supply valve to introduce pressurized air into a second chamber of the injection head urging the injection valve towards a closed position.

14. The method for the fabrication of a container according to claim 11, wherein the step of closing the injection valve includes actuating a pressurized air extraction valve to expel air from a first chamber of the injection head, the expelling of air contained in the first chamber allowing the injection valve to move towards a closed position.

* * * * *